United States Patent [19]

Eishun et al.

[11] 3,929,750

[45] Dec. 30, 1975

[54] PROCESS FOR PREPARING POLYIONCOMPLEXES

[75] Inventors: Tsuchida Eishun, Tokyo; Osada Yoshihito, Mito, both of Japan

[73] Assignee: The Fujikura Cable Works, Ltd., Tokyo, Japan

[22] Filed: May 9, 1973

[21] Appl. No.: 358,513

[30] Foreign Application Priority Data

May 13, 1972 Japan................................. 47-47536
May 13, 1972 Japan................................. 47-47537

[52] U.S. Cl. ... 260/874; 117/126 R; 117/138.8 UF; 117/161 UN; 260/80 R; 260/80 P; 260/875
[51] Int. Cl.² ..................... C08L 23/00; C08L 25/00; C08L 29/00; C08F 210/00
[58] Field of Search ........ 260/80 R, 80 P, 874, 875, 260/2.1 E

[56] References Cited
UNITED STATES PATENTS

| | | | |
|---|---|---|---|
| 2,795,567 | 6/1957 | Ruehrwein | 260/4 R X |
| 2,832,747 | 4/1958 | Jackson | 260/874 X |
| 3,041,292 | 6/1962 | Hatch | 260/2.1 E |
| 3,083,118 | 3/1963 | Bridgeford | 260/2.1 E X |
| 3,467,604 | 9/1969 | Michaels | 260/874 X |
| 3,511,898 | 5/1970 | Dekking | 260/875 X |
| 3,711,573 | 1/1973 | Nagy | 260/874 |

OTHER PUBLICATIONS

Chem. Abs. Vol. 76, 1972, pp. 113,684p, Tsuchida et al., "Polycation Polymers of Integral Type."

*Primary Examiner*—Joseph L. Schofer
*Assistant Examiner*—Herbert J. Lilling
*Attorney, Agent, or Firm*—Toren, McGeady and Stanger

[57] ABSTRACT

When a polycation of integral type is reacted with a polymer of acrylic or methacrylic acid, or a polymer formed in a polymerization system of acrylic or methacrylic acid, a soluble polyioncomplex is obtained. In this process, the composition of the resulted polyioncomplex can be controllably varied by performing the reaction in the presence of various amounts of an alkali. The products show considerable promise in the field of molding and coating techniques.

5 Claims, No Drawings

PROCESS FOR PREPARING POLYIONCOMPLEXES

SUMMARY OF THE INVENTION

This invention relates to a process for preparing a polyioncomplex, and, more particularly, to a process wherein not only a water-insoluble polyioncomplex, but also, water-soluble polyionic complexes can be prepared by reacting a polycation of the integral type with a specific polyanion. No water-soluble polyioncomplex has been prepared by the prior art.

BACKGROUND OF THE INVENTION AND PRIOR ART

It is well known that when an aqueous solution of a polyelectrolyte is mixed with an aqueous solution of a polyelectrolyte containing ionic moieties of the opposite sign, the two polyelectrolytes react rapidly to form a polyioncomplex. The prior polyioncomplexes of this kind have been obtained from combinations of strong polyelectrolytes, such as, polyvinylbenzyltrimethylammonium chloride and sodium polystyrenesulfonate. They are all water-insoluble. (See Encyclopedia of Chemical Technology, 2nd Ed., Vol. 16, pages 117–132, John Wiley and Sons Inc.)

Although the prior polyelectrolyte complexes are insoluble in single or binary solvents due to a synergistic interaction between polymers, they can be dissolved in a ternary solvent consisting of water, a water soluble organic solvent, and a strongly ionized electrolyte. Moreover, these prior polyioncomplexes are soluble only in a ternary solvent having a composition in a specific region of the phase diagram. Such solubility is considered to be due to weakening of the Coulomb forces in the polyioncomplex by the strongly ionized electrolyte and solubilizing of the hydrophobic moieties of the polyioncomplex by the organic solvent.

DESCRIPTION OF THE INVENTION

It is the primary object of this invention to provide a novel process for preparing soluble polyioncomplexes which have never been suggested.

This object can be achieved by the present invention which provides a process for preparing a polyioncomplex comprising reacting a polycation of the integral type having the general formula

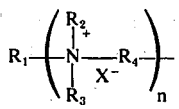

wherein $R_1$ and $R_4$ are selected from the group consisting of alkylene radicals, aralkylene radicals, arylene radicals, piperazine ring radicals, and alicyclic radicals, $R_2$ and $R_3$ are similar or dissimilar radicals having three or less carbon atoms selected from the group consisting of alkyl radicals, alkoxyalcohol radicals, and benzylalkyl radicals, $X^-$ is a counterion, and $n$ is a positive integer, with a polyanion selected from the group of polyacrylic acids and polymethacrylic acids.

The useful polycations of integral type of the invention are exemplified by poly-N,N,N',N'-tetramethylethylene-N-p-xylylenediammonium dichloride (sometimes hereinafter denoted by "2X") having the structural formula

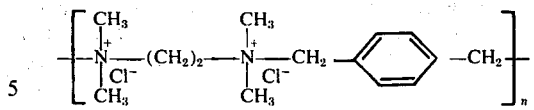

poly-N,N,N',N'-tetramethylhexylene-N-p-xylylenediammonium dichloride (sometimes hereinafter denoted by "6X") having the structural formula

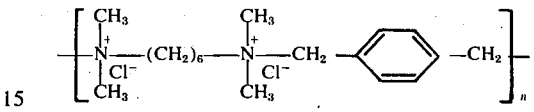

poly-N,N-dimethylhexylammonium chloride (sometimes hereinafter denoted by "6'6") having the structural formula

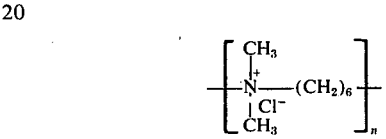

and poly-N-p-xylene-N,N-dimethylpiperazinium dichloride (sometimes hereinafter denoted by "PiX") having the structural formula

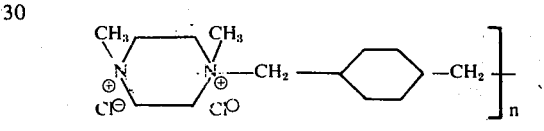

In the above formulas, $n$ is a positive integer.

Polymers, such as polyacrylic acids having a molecular weight of about 4,700 and polymethacrylic acids having a molecular weight of about $7 \times 10^4$, can be used as the polyanion to be reacted with one of the above polycations. A polymer which is formed in a polymerization system of acrylic or methacrylic acid can be employed in situ.

These polyanions are weak acids and generally have a degree of dissociation of less than a few percent depending on their concentration. This fact is of decisive importance with respect to the structure and the properties of the polyioncomplexes of this invention which are prepared from the above-mentioned polycations and polyanions. The reason is that dissociated carboxyl anions interact with the positive charges of a polycation of the integral type due to the Coulomb forces, while undissociated carboxyl radicals remain hydrophilic.

When a polycation chloride reacts with one of the polyanions, hydrochloric acid is set free and the pH value of the solution decreases. The formation of polyioncomplexes proceeds at a low pH and a polyioncomplex containing an excess of the polyanion is formed, as seen from the composition of a polyioncomplex formed at pH 3.0 in which the ratio of the polycation to the polyanion (in this case, polymethacrylic acid) is 1 : 5 as determined by conductometric titrations and measurements of the change in the hydrogen ion concentration. This fact means that the main chain of the polymethacrylic acid combined in the formed polyioncomplex is partly in a "released state". That is to say, the chain of the polymethacrylic acid has unfastened parts in the form of loops between the binding sites. Such released parts bring a larger interface between the polyioncomplex and the solvent (water) and the degree of freedom increases. As a result, the solubility of the formed polyioncomplex in the solvent increases. In fact, polyioncomplexes having the released parts of the polyanion can be water soluble in the presence of a mineral or organic acid, such as, diluted hydrochloric acid, chloroacetic acid or formic acid.

On the other hand, when caustic soda is added to a solution of a polymethacrylic acid or a polyacrylic acid in order to increase the pH value, a salt is formed at a pH value in the range of 4–11. The degree of dissociation rapidly increases as the amount of sodium hydroxide added increases. When a quantity of the sodium hydroxide equivalent to that of the polymethacrylic or polyacrylic acid employed is added to the solution, the anionic polyelectrolyte becomes a completely dissociated polyanion.

In this state of the polyanion, a polycation of the integral type can react with an equivalent amount of a polyanion to form the so-called "ladder complex" wherein the polycation/polyanion ratio is 1 : 1. The compositions of the formed polyioncomplex can be varied, as desired, by adjusting the amounts of alkali added to the solution of the polyanion.

The polyioncomplex which has been formed by employing a polyanion solution with an equivalent amount of alkali can be converted to a water-soluble complex by further adding the same quantity of polyanion to it. In dissolving the polyioncomplex, a ternary solvent of water, a water soluble organic solvent, and a strongly ionized electrolyte is not required.

In the case of reacting a polycation of the integral type with the above-mentioned polyanion, a water insoluble polyioncomplex produced by using a polyanion solution with an equivalent amount of sodium hydroxide as the alkali, may be converted gradually to a water soluble complex as a polyanion solution neutralized with caustic soda is added dropwise. When the ratio of the polyanion to polycation increases 2 : 1 to 3 : 1, the formed polyioncomplex is dissolved completely in water, to form a completely aqueous solution.

These polycations are of the integral type. Thus, even when they form polyioncomplexes, a binding cation site of the polycation is not protected by the hydrophobic moiety. Accordingly, anionic sites of the additional polyanion are further arranged around the binding cation site to release the binding. Consequently, a localized high density of ions is formed as in the case when the above-mentioned ternary solvent is employed. It is considered that this localized high density weakens the ionic bond and causes the solubilization.

When an aqueous solution of the polyioncomplex is applied on a substrate, a durable transparent, colorless film is formed. Thus, the solutions of the polyioncomplex according to this invention are employable for forming protective coats or films. Many applications are anticipated by their distinguished properties.

In addition, we have discovered that a polyacrylic or polymethacrylic acid which is formed in the polymerization system of an acrylic or methacrylic acid can be reacted in situ with a polycation of the integral type to form polyioncomplexes. The embodiments are also included within the scope of this invention.

The process of the invention resides in that acrylic or methacrylic acid, as an anionic monomer, is polymerized by adding a water soluble radical initiator, under irradiation with radiation or ultraviolet light, or by heating without a catalyst, in the presence of an integral type polycation. In the course of the reaction, a growing chain combines gradually with the integral type polycation and continues to grow. Consequently, the product can be obtained as a "linear polyioncomplex" consisting of equivalent quantities of the polycation and polyanion (i.e., polyacrylic or polymethacrylic acid). A product having the high regularity of a desired structure can be obtained by controlling the reaction conditions.

Since the polyioncomplex having such a structure has a large surface area contacting the water, and its thermal motion is very vigorous, they are usually quite soluble. In fact, all the polyioncomplexes prepared according to this invention are obtained dissolved in aqueous solutions.

For example, a polyioncomplex which is prepared by radical-polymerizing acrylic or methacrylic acid in the presence of the equivalent amount of a polycation is obtained to form a transparent, colorless aqueous solution. This product, as is, may be applied over a substrate to form a transparent coating.

Apart from the water soluble polyioncomplexes described above, when a polyioncomplex is prepared from a polymethacrylic acid and an integral type polycation without the addition of alkali, its molecules associate in a few minutes or tens of minutes to form a secondary structure, and may be converted to a thread-like shape which, on drying, is water-insoluble.

As described above, the problem due to the insolubility of the prior art polyioncomplexes and their unsuitability for various fields of application has now been solved by virtue of this invention. In addition, this invention has an excellent advantage that a soluble polyioncomplex of desired composition can be easily produced. The products have possibilities for use for various ends, depending on their own properties.

The following examples will illustrate the invention. They are not intended to limit it in any manner. For the sake of brevity in these examples, PMAA is used for polymethacrylic acid, PAA for polyacrylic acid, MAA for methacrylic acid, and AA for acrylic acid.

EXAMPLE 1

In 100 ml of pure water were dissolved 1.4 g of PMAA having a molecular weight of about $7 \times 10^4$ and varied amounts of sodium hydroxide (NaOH) as indicated in Table 1 below. Each of the solutions were mixed with 3.5 g of polycation 2X having a molecular weight of about $1 \times 10^4$ which had been dissolved in 100 ml of pure water at room temperature, and white colloidal gels were immediately produced. After being stirred for about 30 minutes, each product was centrifuged, washed and dried, to obtain a white powder. Polyioncomplexes formed with small amounts of NaOH are relatively brittle and porous, while those formed with increased amounts of NaOH became progressively harder and denser.

The polyioncomplexes thus obtained are insoluble in water, alcohols, or organic solvents, such as aliphatic and aromatic hydrocarbons. However, they are found to be soluble in water in the presence of diluted sulfuric acid, diluted hydrochloric acid, formic acid, chloroacetic acid, or acetic acid.

Table 1

Relation between amount of NaOH added and composition of a polyioncomplex, determined by variations in pH

| Run | Amount of NaOh (g) | NaOH/PMAA | NaOH/PMAA Mole/Unit Mole |
|---|---|---|---|
| 1 | 0 | 0 | 1/5 |
| 2 | 0.22 | 0.33 | 1/1.7 |
| 3 | 0.44 | 0.65 | 1/1.25 |
| 4 | 0.65 | 1.00 | 1/1 |

EXAMPLE 2

The polyioncomplex obtained according to Example 1 was dissolved in 10 percent hydrochloric acid and, separately, in 15 percent acetic acid. The resulting solutions were applied over the surfaces of a flat glass plate and a sheet of Teflon, to form a coat 0.5 mm thick. Then, the coat was dried at 40°C in an atmosphere maintained at a relative humidity of 65 percent, to produce a transparent colorless film. Similar results were obtained with other polyioncomplexes of Example 1.

EXAMPLE 3

A solution of 1 g of the same PMAA as of Example 1 in 100 ml water was added dropwise slowly to a solution of 3 g of polycation 2X in 100 ml water with stirring, and there a small amount of white precipitate was formed. The precipitates were then allowed to stand for about 10 hours, to gradually form a coagulum. This coagulum was centrifuged and dried, to obtain a final product.

EXAMPLE 4

In 100 ml pure water are dissolved 1.1 g of PAA having a molecular weight of about 47,000 and varied amounts of sodium hydroxide (NaOH) as indicated in Table 2 below. Each of the solutions were mixed with 3.5 g of 2X having a molecular weight of about $1 \times 10^4$ which had been dissolved in 100 ml of pure water at room temperature and white colloidal gels were immediately produced. Then, a procedure similar to that of Example 1 were followed to obtain polyioncomplexes having the compositions tabulated in Table 2. Films were produced by the same procedure as in Example 2.

Table 2

Relation between amounts of NaOH added and compositions of a polyioncomplexes determined by variations in pH

| Run | Amount of NaOH (g) | NaOH/PAA | NaOH/PAA Mole/Unit Mole |
|---|---|---|---|
| 1 | 0 | 0 | 1/4 |
| 2 | 0.22 | 0.33 | 1/1.6 |
| 3 | 0.44 | 0.65 | 1/1.2 |
| 4 | 0.65 | 1.00 | 1/1 |

EXAMPLE 5

1.4 g of PMAA having a molecular weight of about 7,000 and varied amounts of sodium hydroxide indicated in Table 1 were dissolved in 100 ml of pure water. Each of the solutions were mixed with 3.5 g of polycation PiX, having a molecular weight of about 8,000 which had been dissolved in 100 ml of pure water at room temperature, whereupon white colloidal gels were formed. The gels were treated in accordance with the procedure of Example 1, to obtain polyioncomplexes. Films were produced by the same procedure as in Example 2.

The procedure of this Example was repeated except that 3.5 g of the polycation PiX was replaced by 4.0 g of polycation 6X, having a molecular weight of about $3 \times 10^4$ or 3.8 g of polycation 6.6, having a molecular weight of about $2 \times 10^4$. The relations between amounts added and compositions of polyioncomplexes are similar to those shown in Table 1 in every case when any one of polyion chlorides above was employed.

EXAMPLE 6

A solution of 5.5 g of PMAA and an amount of sodium hydroxide equivalent thereto in 200 ml water was added dropwise slowly to a solution of 17.5 g of 2X dissolved in 100 ml water. Immediately upon the addition, a white colloidal gel was formed, and the quantity thereof continued to increase until the mole ratio of 2X to PMAA became equal to unity, i.e., the added solution of PMAA amounting to 100 ml. However, the amount of the colloidal gel decreased gradually as the solution of PMAA was further added. When the mole ratio of 2X to PMAA reached 2, i.e., 200 ml solution of PMAA having been added, the colloidal gel dissolved completely.

The aqueous solution of polyioncomplex thus obtained, were applied to a surface of a flat glass plate or a sheet of Teflon to form a coat 0.5 mm thick. On drying the coat at 40°C in an atmosphere maintained at a relative humidity of 65 percent, a transparent colorless film was obtained.

EXAMPLE 7

1.4 g of MAA and 3.5 g of 2X were charged with or without sodium hydroxide into a polymerization tube. Enough pure water was added to dissolve and make a volume of 300 ml. Thereafter, 0.1 g of potassium persulfate as the radical initiator was added and oxygen was removed from the tube, which was then sealed off in vacuum. Thereafter, the polymerization reaction was allowed to proceed at 60°C for 2 hours. The resulting conversions are shown in Table 3.

Table 3

| Run | NaOH (g) | NaOH/MAA | Conversion (%) | NaOH/MAA Mole/Unit Mole |
|---|---|---|---|---|
| 1 | 0 | 0 | 100 | Transparent, colorless liquid |
| 2 | 0.65 | 1.0 | 20 | Transparent, viscid precipitate |

A part of the aqueous polyion complex solution from run NO. 1 was applied on a flat surface of a glass plate or a surface of a sheet of Teflon to form a coat 0.5 mm thick. The coat was dried at 40°C in an atmosphere kept at a relative humidity of 65 percent to form a transparent, colorless film.

EXAMPLE 8

1.1 g AA and 3.5 g of 2X were charged, with or without an amount of sodium hydroxide shown in Table 3, into a polymerization tube. Enough pure water was added to dissolve it and make a volume of 300 ml. Then, a procedure similar to that of Example 7 were carried out to obtain a polyioncomplex. Depending on the conditions of the polymerization, the product can be formed into a film.

EXAMPLE 9

1.4 g of MAA and 3.5 g of PiX were charged, with or without sodium hydroxide, into a polymerization tube. Enough pure water was added to dissolve the contents and make a volume of 300 ml. Then, a procedure similar to that of Example 7 or 8 were performed to obtain a polyioncomplex. Depending on the conditions of the polymerization, the product can be formed into a film.

What is claimed is:

1. A process for preparing a water soluble polyioncomplex consisting essentially of reacting an aqueous solution of a polycation of the integral type having the general formula

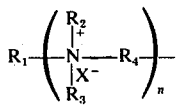

wherein $R_1$ and $R_4$ are selected from the group consisting of alkylene, aralkylene, arylene, piperazine ring, and alicyclic radicals, $R_2$ and $R_3$ are similar or dissimilar radicals, having carbon atoms not exceeding 3, selected from the group consisting of alkyl, alkoxyalcohol and benzylalkyl radicals, $X^-$ is a counterion, and $n$ is a positive integer, an aqueous solution of a polyanion selected from the group consisting of polyacrylic and polymethacrylic acids at a pH of 4–11 in the presence of alkali, the mole ratio of polycation to polyanion being in the range from 1:1 to 1:3.

2. A process for preparing a water soluble polyioncomplex consisting essentially of reacting an aqueous solution of an integral type polycation selected from the group consisting of poly-N,N,N',N'-tetramethylethylene-p-xylene-diammonium dichloride, poly-N,N,N',N'-tetramethylhexylene-p-xylylenediammonium dichloride, poly-N,N-dimethylhexylammonium chloride, and poly-N,N'-dimethyl-p-xylyenepiperazinium dichloride with an aqueous solution of a polyanion selected from the group consisting of polyacrylic and polymethacrylic acids at a pH of 4–11 in the presence of alkali, the mole ratio of polycation to polyanion being in the range from 1:1 to 1:3.

3. A process for preparing a water soluble polyioncomplex consisting essentially of reacting an aqueous solution of a polycation of the integral type having the general formula

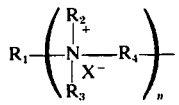

wherein $R_1$ and $R_4$ are selected from the group consisting of alkylene, aralkylene, arylene, piperazine ring, and alicyclic radicals, $R_2$ and $R_3$ are similar or dissimilar radicals having carbon atoms not exceeding 3, selected from the group consisting of alkyl, alkoxyalcohol, and benzyalkyl radicals, $X^-$ is a counterion, and $n$ is a positive integer, an aqueous solution of a polyacrylic acid or a polymethacrylic acid which is being formed in the reaction mixture, the ratio of said polycation to said polyacrylic acid or polymethacrylic acid being 1:1.

4. The process as claimed in claim 3 in which said polymerization system contains a water soluble radical initiator.

5. A process for preparing a water soluble polyioncomplex consisting essentially of reacting an aqueous solution of an integral type polycation selected from the group consisting of poly-N,N,N',N'-tetramethylethylene-p-xylylenediammonium dichloride, poly-N,N,N',N'-tetramethylhexylene-p-xylylenediammonium dichloride, poly-N,N-dimethylhexylammonium chloride, and poly-N,N'-dimethyl-p-xylyenepiperazinium dichloride with an aqueous solution of a polyacrylic acid or a polymethacrylic acid which is being formed in the reaction mixture, the ratio of said polycation to said polyacrylic acid or polymethacrylic acid being 1:1.

* * * * *